Jan. 26, 1960  P. M. VAN ALPHEN ET AL  2,922,336
X-RAY IMAGE INTENSIFYING AND VIEWING DEVICE
Filed Aug. 26, 1954

INVENTOR.
P. M. VAN ALPHEN
J. VAN DER WAL
BY
AGENT

United States Patent Office 2,922,336
Patented Jan. 26, 1960

2,922,336

X-RAY IMAGE INTENSIFYING AND VIEWING DEVICE

Pieter Martinus van Alphen and Johannes van der Wal, Eindhoven, Netherlands, assignors, by mesne assignments, to North American Philips Company, Inc., New York, N.Y., a corporation of Delaware Application August 26, 1954, Serial No. 452,427

Claims priority, application Netherlands November 12, 1953

6 Claims. (Cl. 88—39)

This invention relates to devices for intensifying and viewing X-ray images.

The invention comprises an electronic image-amplifying tube in combination with an objective and a magnifying glass arranged behind the area in the image-amplifying tube at which the electronically-amplified X-ray image is seen, and a transparent screen having light-diffusing properties, which screen may be removed, if desired, is arranged at the area at which an image of the electronically amplified X-ray image is produced by the objective in such manner that both the image with diffuse luminescence and the image with directed luminescence are seen through the magnifying glass, if desired with alternation.

The use of an X-ray device in combination with an electronic image-amplifying or image-intensifying tube enables, by means of a suitable optical system for visible light, to make visible an image of the object to be reproduced by the X-ray device, which image has a brightness considerably greater than that of the X-ray image proper. It has been found in practice that in this kind of device a pupil of emergence or exit pupil located freely in space affords determined practical advantages, as compared with a device with an eye cup provided on the optical system for automatically moving the eye of an observer into that position at which the pupil of emergence occupies the correct position with respect to the eye. However, on the other hand, the free location in space of the pupil of emergence, which must necessarily be comparatively small, involves the disadvantage that it takes comparatively much time for the observer to find the pupil, which disadvantage becomes manifest more strongly, if the device during the observation of a determined object is moved into different spatial positions, as is common practive for X-ray devices. Such movements naturally also involve displacements of the pupil of emergence of the optical system.

The use of the above-mentioned transparent screen with light-diffusing properties has the effect so-to-say to enlarge the pupil of emergence, that is to say the observer's eye is automatically moved into the direction of maximum luminance as a result of the difference in luminance of the curve representing the light-diffusing properties of any arbitrary point on the frosted screen. With one embodiment of the light-diffusing screen, the observer in the position of maximum luminance can remove the said screen by a single movement of his hand and he then sees the whole of the image of directed luminescence produced by the objective of the electronically-amplified X-ray image. With another embodiment, the observer in the position of maximum luminance need not carry out any manipulation to observe already part of the image of directed luminescence. With the latter embodiment, it is necessary to remove the screen for observing the whole of the image in the position of directed luminescence. In the device according to the invention, the screen thus affords the advantage that the time required by the observer to find the pupil of emergence of the optical system is considerably shortened.

The said screen may consist of a glass plate having a light-diffusing surface which is larger than the said image, in which event the screen always has to be turned away. However, in one advantageous embodiment of the invention, the light-diffusing screen may alternatively be so proportioned as to overlap only in part the image of the electronically amplified X-ray image produced by the objective. In the latter embodiment the screen may consist of, for example, a frosted ring or several spaced frosted strips of glass, the enclosed space in the frosted ring or between the strips being formed by clear glass or left wholly free.

In order that the invention may be readily carried into effect, it will now be described with reference to the accompanying drawing, given by way of example, in which.

Figure 1:
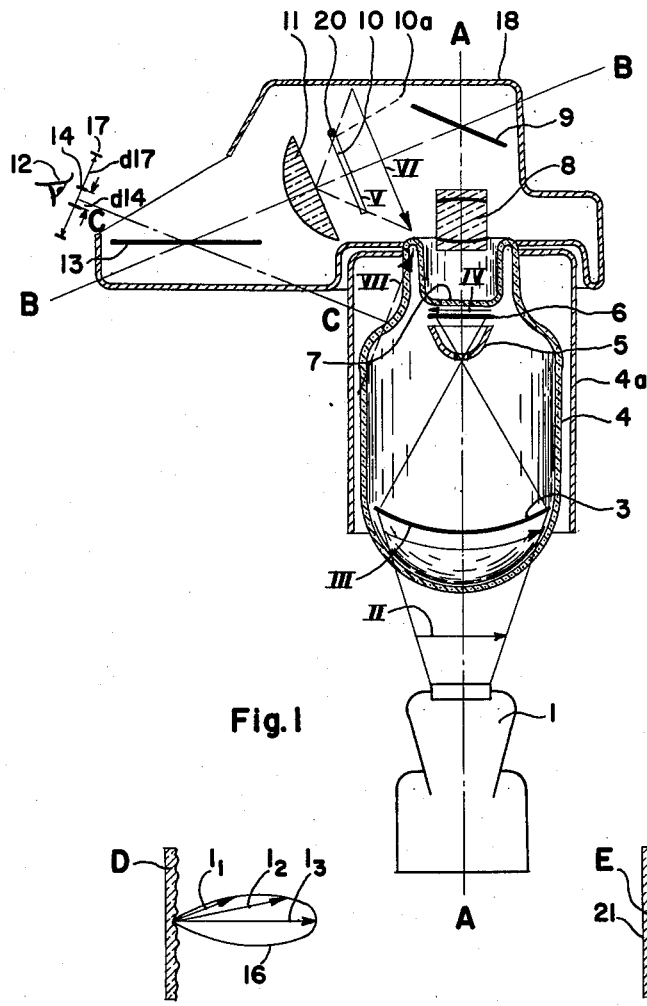
Fig. 1 shows diagrammatically one embodiment of the device according to the invention.

In Fig. 1, reference numeral 1 indicates an X-ray tube producing an X-ray image III of the object II on the primary or complex screen 3 of an electronic image-amplifying tube 4. By means of the electronic image-amplifying tube, the anode of which is indicated by 5, a secondary or single luminescent screen 6 has produced on it a visible image IV, of which the brightness is materially increased not only as a result of the reduction in size occurring in the image-amplifying tube, but also as a result of the energy supplied to the electron beam in the said tube. The image IV is located on the X-ray tube side of a window 7 in the image-amplifying tube 4 and serves as an object for an objective 8 arranged on the other side of the window 7 in the axis A—A. Said objective produces a real image V via an inclined mirror 9, which deflects the light beam in the direction B—B at the area of a removable screen 10. If the screen 10 is imagined to be turned away for a moment so as to occupy the dotted position 10a, the real image V may be observed through a magnifying glass 11, which is in the form of an eye-piece, in the manner as is usual for a microscope. An observer who would look in the direction of the axis B—B would see the real image V with magnification at the area VI. However, due to the presence of a mirror 13, an observer whose eye is located at 12 and hence in the axis C—C representing the direction of the main direction again deflected by the mirror 13 sees the virtual image at VII.

Figure 2A:
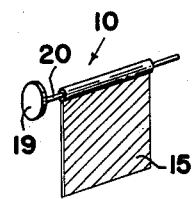
Fig. 2a shows, for the sake of clearness, the curve representing the luminances in different directions of any arbitrary image of a piece of frosted glass.

Without entering into detail, it may be said that the pupil of emergence of the optical system is located at 14, which area, as follows from Fig. 1, is located freely in space (there is no fixed eye-piece as in the usual microscope) and has a diameter indicated by $d14$, which is of the order of, for example, 25 mms. It will be evident that it may be difficult for the observer to find this pupil of emergence, more particularly if the whole equipment, after one observation, is displaced with respect to the object II to be viewed. This naturally also results in a spatial displacement of the pupil of emergence 14. According to the invention, by providing the screen 10, which for the sake of simplicity is imagined for the time being to consist of a glass plate 15 (Fig. 3) which is frosted throughout its surface, it is ensured that the pupil of emergence indicated by 14 in Fig. 1 is greatly diffused and hence enlarged, as shown at 17. This is a result of the straying properties of the surface of glass plate 15. In Fig. 2a this is shown more clearly; 16 indicates the curve showing the luminance of an arbitrary point on the frosted plate D. It follows from Fig. 2a that the luminance $l_1$ is smaller than the luminance $l_2$, whereas the luminance $l_3$, which is at right angles to the glass plate, is a maximum. If the observer's eye 12 gets into the enlarged pupil of emergence 17, the diameter of which is indicated by $d_{17}$, he will so-to-say automatically move his eye till he has found the maximum luminance $l_3$ of Fig. 2a. He has thus automatically entered the range of the pupil of emergence proper 14 of diameter $d_{14}$ of the optical system. If, now, the screen 10 is turned into the dotted position 10a by operating a knob 19 projecting from the housing 18 and secured to a spindle 20, the observer sees the image VII in full brightness.

Figure 2B:
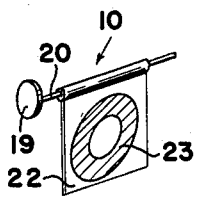
Fig. 2b shows, for comparison, the so-called aperture cone of a piece of clear glass.

For the sake of clearness, Fig. 2 shows in addition the so-called aperture cone of a clear glass plate 21 for an arbitrary point E thereon. It appears therefrom that the light entering the plate 21 from the left-hand side at E emerges within a small angle $p$ in different directions to the right, but that the luminances in all directions are equal.

Figures 3, 4, 5:
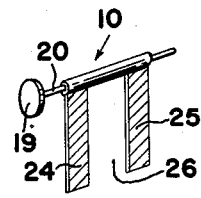
Figs. 3, 4 and 5 show several embodiments of the transparent screen with light-diffusing properties according to the invention.

Instead of utilising the screen shown in Fig. 3, use may be made of a glass screen 22 as shown in Fig. 4, which exhibits an annular frosted portion 23 and is otherwise clear. When use is made of such a screen, whereby the image to be observed is partly covered by the ring 23, the observer whose eye is near the pupil of emergence 14 sees part of the image in the diffused and hence enlarged pupil of emergence 17. This leads to easier finding of the pupil of emergence proper. When the screen is turned away and when the observer keeps his eye 12 in the position of maximum luminances in the partly diffused image, he sees the whole image VII in the conditions of directed luminescence.

In the embodiment of the screen shown in Fig. 5, two separate strips of frosted glass 24 and 25 are secured to the spindles 20, leaving between them an open space 26. This screen may also be used with advantage.

As mentioned before, the invention is advantageous more particularly of the X-ray device, together with the associated image-amplifying tube and optical system, is movable with respect to the object to be viewed since the pupil of emergence 14 of the optical system just then moves in space upon each displacement. Consequently, the invention is notably of great importance if the housing 18 containing the optical system can turn about the axis A—A with respect to the housing 4a containing the image-amplifying tube. It will be evident that the pupil of emergence is also displaced in space upon such a displacement.

What is claimed is:

1. In combination with an image-intensifying device having an optical axis and an output luminescent screen on which a real luminous image appears, an optical system for viewing said luminous image from a plurality of different positions comprising a housing rotatably mounted on said device for rotation about the optical axis thereof, an objective lens and reflecting means at an angle to the axis of the device and within said housing and optically aligned with the axis of said device and producing a real light image of said luminous image at a given area along an optical path displaced transversely to the device axis, a movable member of light-diffusing material mounted approximately at said given area, magnifying means mounted at the side of said member remote from said objective lens for magnifying the light image and establishing a given pupil of emergence of the optical system from which the magnified image may be viewed by an external observer, said housing having an opening through which the magnified light image may be viewed and of a size substantially larger than the said pupil of emergence and free of any eye-fixing device whereby location of the pupil of emergence by the external observer is rendered difficult, and means for selectively moving said member of light-diffusing material to a first position in said optical path whereat said light image may be viewed through the light-diffusing material to substantially enlarge the pupil of emergence of the optical system to assist in locating its position, and to a second position outside of the optical path so that the light image may be viewed directly at maximum brightness.

2. A combination as set forth in claim 1 wherein the optical axis of the magnifying means and the axis of the device lie in the same plane, and a pair of mirrors are provided intersecting the optical axis of the magnifying means, one on either side of the magnifying means.

3. In combination with an image-intensifying device having an optical axis and an output luminescent screen on which a real luminous image appears, an optical system for viewing said luminous image from a plurality of different positions comprising a housing rotatably mounted on said device for rotation about the optical axis thereof, an objective lens and mirror inclined at an angle to the axis of the device and within said housing and optically aligned with the axis of said device and producing a real light image of said luminous image at a given area along an optical path displaced transversely to the axis of the device, a pivotable frosted glass plate mounted approximately at said given area, magnifying means mounted at the side of said plate remote from said objective lens for magnifying the light image and establishing a given pupil of emergence of the optical system from which the magnified image may be viewed by an external observer, said housing having an opening through which the magnified light image may be viewed and of a size substantially larger than the said pupil of emergence and free of any eye-fixing device whereby location of the pupil of emergence by the external observer is rendered difficult, and means for selectively pivoting said frosted glass plate to a first position in said optical path whereat said light image may be viewed through the plate to substantially enlarge the pupil of emergence of the optical system to assist in locating its position, and to a second position outside of the optical path so that the light image may be viewed directly at maximum brightness.

4. A combination as set forth in claim 3 wherein the frosted glass plate has a size exceeding that of the image at the given area.

5. A combination as set forth in claim 3 wherein the frosted plate has an annular shape.

6. A combination as set forth in claim 3 wherein the frosted plate comprises spaced, parallel, frosted portions.

References Cited in the file of this patent

UNITED STATES PATENTS

| | | |
|---|---|---|
| 545,743 | Stevens | Sept. 3, 1895 |
| 1,281,047 | Matsui | Oct. 8, 1918 |
| 2,110,324 | Castle | Mar. 8, 1938 |
| 2,170,967 | Eppenstein et al. | Aug. 29, 1939 |
| 2,364,652 | Pollock | Dec. 12, 1944 |
| 2,401,224 | Burton | May 28, 1946 |
| 2,433,674 | O'Brien | Dec. 30, 1947 |
| 2,496,404 | Paillais | Feb. 7, 1950 |
| 2,550,698 | King et al. | May 1, 1951 |
| 2,631,244 | Longini | Mar. 10, 1953 |
| 2,648,776 | Eitel, Jr. | Aug. 11, 1953 |
| 2,673,492 | Reswick | Mar. 30, 1954 |

FOREIGN PATENTS

| | | |
|---|---|---|
| 387,544 | Great Britain | Feb. 9, 1933 |